(12) United States Patent
Bent et al.

(10) Patent No.: US 7,523,129 B1
(45) Date of Patent: *Apr. 21, 2009

(54) DATA-BINDING ENHANCEMENTS

(75) Inventors: Samuel W. Bent, Bellevue, WA (US); Namita Gupta, Seattle, WA (US); David J. Jenni, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 819 days.

This patent is subject to a terminal disclaimer.

(21) Appl. No.: 10/941,525

(22) Filed: Sep. 15, 2004

(51) Int. Cl.
*G06F 17/00* (2006.01)
(52) U.S. Cl. .................. 707/102; 715/762
(58) Field of Classification Search .......... 719/310, 719/331, 332; 707/100, 102; 717/100, 109, 717/162, 165; 715/700, 762, 763
See application file for complete search history.

(56) References Cited

U.S. PATENT DOCUMENTS

| 6,023,271 | A  | * | 2/2000  | Quaeler-Bock et al. ..... 715/866 |
| 6,167,455 | A  | * | 12/2000 | Friedman et al. ............. 719/320 |
| 6,429,880 | B2 | * | 8/2002  | Marcos et al. ................ 715/744 |
| 6,463,442 | B1 | * | 10/2002 | Bent et al. ............... 707/103 R |
| 6,738,804 | B1 | * | 5/2004  | Lo ............................. 709/219 |
| 7,099,958 | B2 | * | 8/2006  | Matsutsuka et al. ......... 709/246 |
| 7,194,743 | B2 | * | 3/2007  | Hayton et al. ............... 719/315 |
| 2001/0042140 | A1 | * | 11/2001 | Calder et al. ................ 709/328 |
| 2002/0026447 | A1 | * | 2/2002  | Matsutsuka et al. ...... 707/103 Y |
| 2002/0083426 | A1 | * | 6/2002  | Sistla .......................... 717/168 |
| 2002/0120679 | A1 | * | 8/2002  | Hayton et al. ............... 709/203 |
| 2003/0074634 | A1 | * | 4/2003  | Emmelmann ............... 715/513 |
| 2003/0200501 | A1 | * | 10/2003 | Friebel et al. ............... 715/500 |
| 2004/0021679 | A1 | * | 2/2004  | Chapman et al. ........... 345/700 |
| 2004/0122789 | A1 | * | 6/2004  | Ostertag et al. ................ 707/1 |
| 2004/0227776 | A1 | * | 11/2004 | Bent et al. .................. 345/700 |
| 2004/0230911 | A1 | * | 11/2004 | Bent et al. .................. 715/762 |
| 2005/0108681 | A1 | * | 5/2005  | Bent et al. .................. 717/109 |
| 2005/0114293 | A1 | * | 5/2005  | Gupta et al. .................... 707/1 |
| 2005/0188350 | A1 | * | 8/2005  | Bent et al. .................. 717/106 |
| 2006/0090139 | A1 | * | 4/2006  | Jenni et al. .................. 715/760 |
| 2006/0248169 | A1 | * | 11/2006 | Matsutsuka et al. ......... 709/219 |

FOREIGN PATENT DOCUMENTS

EP          1435567 A2 *  7/2004
WO    WO 2004107200 A1 * 12/2004

* cited by examiner

*Primary Examiner*—Van H Nguyen
(74) *Attorney, Agent, or Firm*—Merchant & Gould, PC

(57) ABSTRACT

A program platform performs data binding process between a user interface and data for display. The invention decouples the user interface and the data, along with its application logic, by providing a mechanism for binding data to the user interface. Dependency property binding allows for binding of data with dynamic properties of an element of a data-programming model of a platform. A fallback value is a user-supplied value that can be used when the binding cannot produce a value from an associated data source. Priority Bindings allow a list of bindings that can become active when other, previous bindings fail.

24 Claims, 3 Drawing Sheets

DATA-BINDING ENHANCEMENTS

RELATED APPLICATIONS

This utility patent application claims the benefit under 35 United States Code §120 of U.S. patent application Ser. No. 10/823,461 and U.S. patent application Ser. No. 10/822,910, both filed on Apr. 13, 2004.

BACKGROUND OF THE INVENTION

The manner in which information is presented to computer users affects the ability of the computer user to understand and comprehend the information. To help the users to more readily grasp the importance of the information, it has become a relatively standard practice to add emphasis to information on computer displays by using color, font styles, and the like.

The code handling the presentation of the information (i.e., the user interface) and the code performing the application logic on the information are typically closely coupled. In such cases, the application logic typically assigns various user interface properties (e.g., color, font, position, size) directly to the data. Thus, when there is a change to the user interface, the logic also changes.

When a text box is used for example, the user interface code listens to determine whether text has changed. Upon such a determination, the user interface code typically validates the changed text and then displays the changed text. This tightly coupled nature of the user-interface and the logic can result in very fragile code, which can be very costly and time consuming to maintain.

SUMMARY OF THE INVENTION

The present invention is directed towards a system and method for enhancing a data binding process between a user interface and data for display. The invention decouples the user interface and the data, along with its application logic, by providing a mechanism for binding data to the user interface. Dependency property binding allows for binding of data with dynamic properties of an element of a data-programming model of a platform. A fallback value is a user-supplied value that can be used when the binding cannot produce a value from an associated data source. Priority Bindings allow a list of bindings that can become active when other, previous bindings fail.

Thus, in accordance with the present invention, an application is separated into independent parts, a logic portion and a UI portion. The logic portion manipulates data values within the application. The UI portion is responsible for the presentation of the data. A binding specification describes a relationship between the UI property and the data value. The binding specification is used by system level code to determine the manner in which it is notified when the data value undergoes a change and the manner in which it directs the UI portion to reflect the change in the UI property. The binding specification identifies a source data item, a path to the data value in the source data item, a target UI element, and the UI property on the target UI element. The binding may be specified using code or markup language.

According to one aspect of the invention, a computer-readable medium has computer executable instructions for controlling user-interface properties with data, the instructions comprising: creating a binding that associates a target property with a source data value that comprises a dependency property; and upon receiving a determination that the associated source data value has undergone a change, evaluating dependencies of the associated source data value, and reflecting changes in the target properties based on the evaluated dependencies.

According to another aspect of the invention, a method for controlling user-interface properties with data comprises: creating a binding that associates a target property with a source data value that comprises a dependency property; and upon receiving a determination that the associated source data value has undergone a change, evaluating dependencies of the associated source data value, and reflecting changes in the target properties based on the evaluated dependencies.

According to yet another aspect of the invention, a system for controlling user-interface properties with data comprises: means for creating a binding that associates a target property with a source data value that comprises a dependency property; and upon receiving a determination that the associated source data value has undergone a change, means for evaluating dependencies of the associated source data value, and means for reflecting changes in the target properties based on the evaluated dependencies.

DETAILED DESCRIPTION OF THE PREFERRED EMBODIMENT

The present invention is directed towards a system and method for enhancing a data binding process between a user interface and data for display. The invention further decouples the user interface and the application logic by providing various mechanisms for associating the data with the user interface. Throughout the following discussion, the term "data-binding" refers to the process of associating data values with UI properties, transferring and updating the data values, and the like.

The terminology and interface specifications used herein are not intended to represent a particular language in which a particular object or method should be written. Rather, the terminology and interface specifications are used to describe the functionality and contents of an interface or object, such as function names, inputs, outputs, return values, and what operations are to be performed using the interface (or what operations are to be performed by the object).

Illustrative Computing Environment

Figure 1:
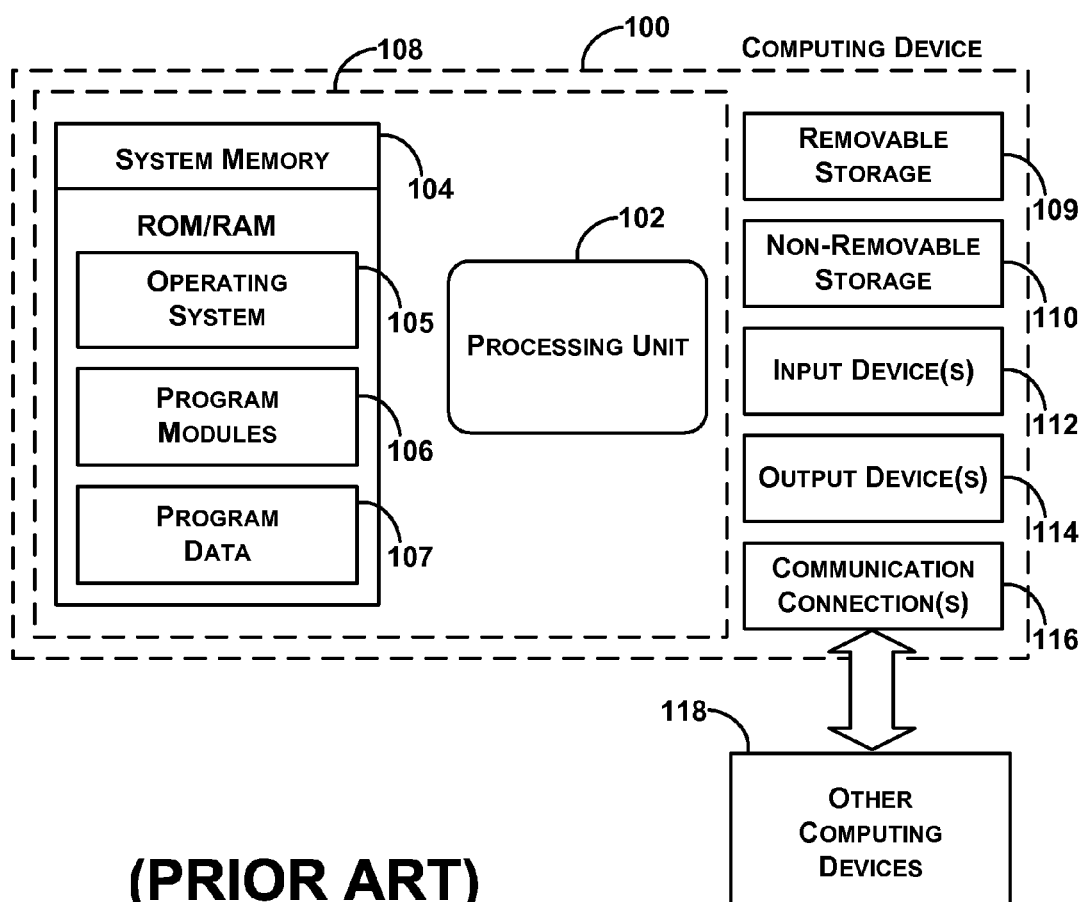
FIG. 1 illustrates an exemplary computing device that may be used in illustrative implementations of the present invention.

FIG. 1 illustrates an exemplary computing device that may be used in illustrative implementations of the present invention. With reference to FIG. 1, computing device 100 typically includes at least one processing unit 102 and system memory 104. Depending on the configuration and type of computing device 100, system memory 104 may be volatile (such as RAM), non-volatile (such as ROM, flash memory, etc.) or some combination of the two. System memory 104 typically includes an operating system 105, one or more program modules 106, and may include program data 107. Examples of program modules 106 include a browser application, a finance management application, a word processor, and the like. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, and the like, may also be included. These and similar peripheral devices are well known in the art and need not be discussed at length here.

Computing device 100 may also contain communication connections 116 that allow the device 100 to communicate with other computing devices 118, such as over a network. Communication connections 116 are one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Illustrative Implementation of Data-Binding

Data-binding provides a declarative way to link properties of user interface elements (such as height, position, inner text, source URL, and the like) to properties of data items. While virtually any object can be treated as a data item, the data item is often a domain-specific object that has no knowledge of the user interface (UI).

Data-binding also allows the author of an application to display a visual representation of the data without being required to add any UI-specific code to the data classes. For example, when the author includes the declaration <TextBox Text="*Bind(Path=CustomerName)"/> in the markup for the application, the value of the CustomerName property of the appropriate data item is automatically propagated to the Text property of the TextBox. Because this is a user-editable property, this is a "two-way" binding, which means firstly that any changes made to the CustomerName value will be automatically shown in the TextBox, and secondly that any changes made in the TextBox (e.g., by user typing) will be automatically sent to the data item.

The application is executed using a program platform, which provides a property system for handling elements, for example, from the UI. One class of the elements contains DependencyObjects, each of which can have any number of property values associated with DependencyProperties (DP). In the example above, TextBox is a DependencyObject that understands a DependencyProperty called "Text".

An "attached" DP is one that is defined and understood by one class, but is set on an element defined by another class. Attached DPs can be used to control layout. In the example listed below, the Canvas.Left property is defined by Canvas, but is set on an element that is contained within the canvas. The element itself does not recognize the property, but merely carries the value for use by the parent canvas. The markup:

<Canvas>
        <Button Canvas.Left="25">Click Me</Button>
    </Canvas> uses an attached property to position a button 25 pixels from the left edge of its enclosing canvas.

Figure 2:
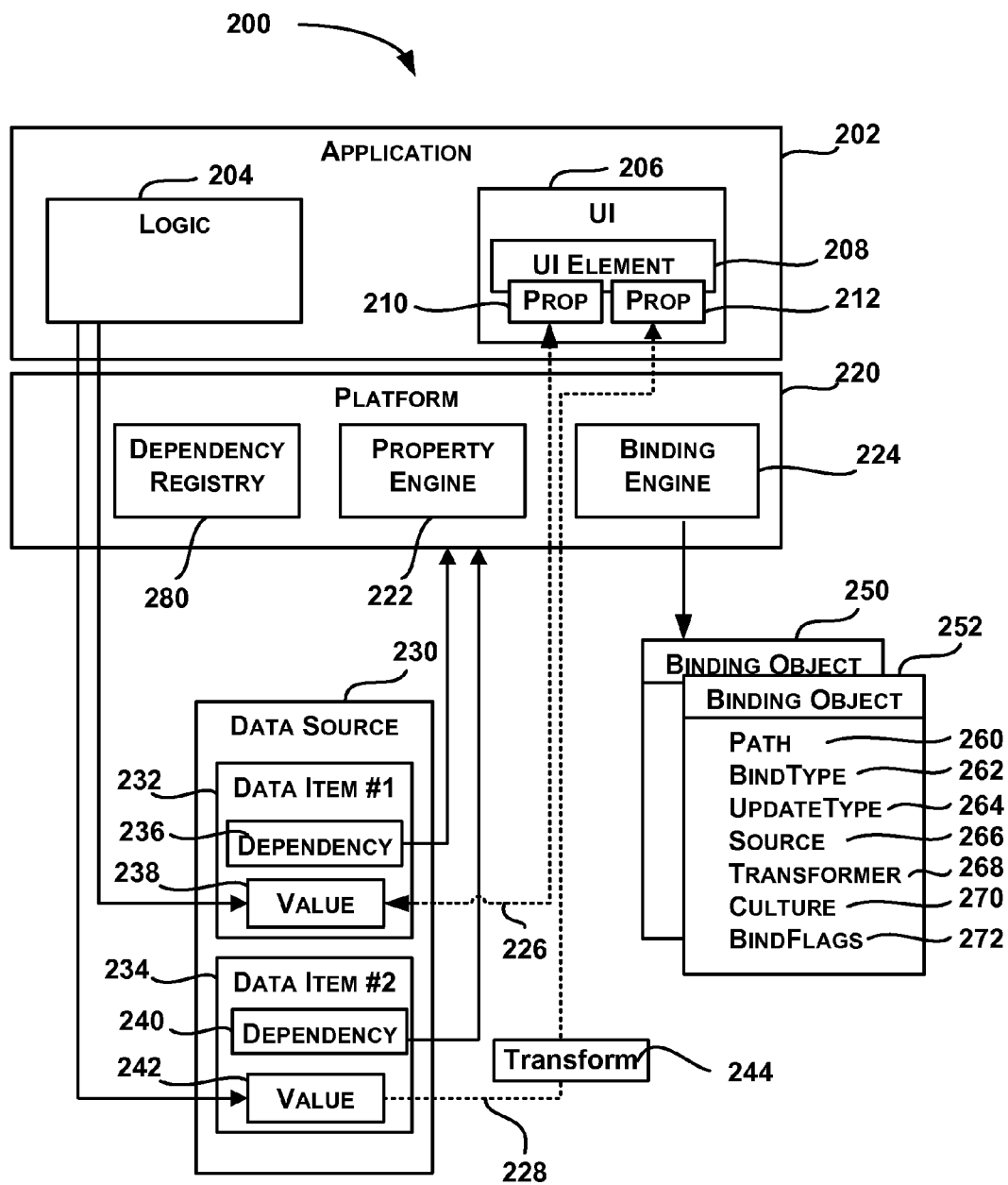
FIG. 2 is a functional block diagram illustrating one embodiment for controlling user interface properties with data in accordance with the present invention.

FIG. 2 is a functional block diagram illustrating one embodiment of a system 200 for controlling user interface properties with data in accordance with the present invention. The system 200 includes an application 202, a platform 220, and a data source 230. Application 202 may be one of applications 106 on computing device 100 shown in FIG. 1. The application 202 includes code (hereinafter referred to as logic 204) for manipulating a data value (e.g., source data value 238). In general, the logic 204 performs validation on data values and updates the data values. Data value (e.g., data value 238) represents the content of a property (i.e., a data source property) of a data item (e.g., data item 232). The data item 232 is located within a data source (e.g., data source 230). Each data source 230 may include several data items, each data item has one or more properties, in which the source data value is stored. Logic 203 may manipulate data values from multiple data sources. The data sources may include an XML document, an object, a dataset, and the like. As will be described in greater detail below, each property of the data item may be used to control the user interface (UI).

The application 202 also includes code (hereinafter referred to as user interface 206) for presenting information. The user interface 206 includes several user interface elements (e.g., user interface element 208). Each user interface element 208 includes one or more properties (e.g., UI properties 210 and 212), such as for displayed text, color, font, position, size, and the like. Then, as described in detail later, these UI properties 210 and 212 are associated with one or more of the data values 238 and 242 in accordance with the present invention.

In general, the association occurs via a binding engine 224 within the platform 220. The platform 220 represents a system layer of services, such as an operating system, a virtual engine, and the like. The platform 220 also includes a property engine 222 that is responsible for maintaining hierarchical information pertaining to the data values 234 and 242 and for updating the associated properties with data values. Even though binding engine 224 and property engine 222 are shown as separate components, one skilled in the art will appreciate that the functionality provided by each may be included within one component (or shared in varying proportions between components) without departing from the present invention.

The association (i.e., bindings) of the data values 238 and 242 to their UI properties 210 and 212 is represented in FIG. 2 by dashed lines from the data value to the UI property (hereinafter referred to as bindings 226 and 228). During the following discussion, the term "data value" may be used interchangeably with the term "source data value". Similarly, the term UI property may be used interchangeably with the term "target property". These bindings 226 and 228 allow dynamic properties (i.e., target properties) to be automatically set from data values (i.e., source data values), such as from properties of arbitrary objects. These bindings may be dynamic so that the bound target property automatically updates to reflect changes in the source data value.

In order to provide this automatic updating capability, the present invention further provides an update mechanism (e.g., represented in FIG. 2 by dependencies 236 and 240 and arrows from the dependencies to platform 220). When property engine 222 detects a change in a data item, the property engine consults dependency registry 280 and notifies the registered dependents.

When a binding 226 and 228 is created, such as through markup, code, and the like, the binding engine 224 creates a binding object (e.g., binding objects 250 and 252) associated with the binding. For example, binding object 252 may represent binding 228 within the binding engine 224. Each binding object includes various properties (e.g., binding properties 260-272). Each of these binding properties 260-272 may be set programmatically.

Dependency Property Binding

Figure 3:
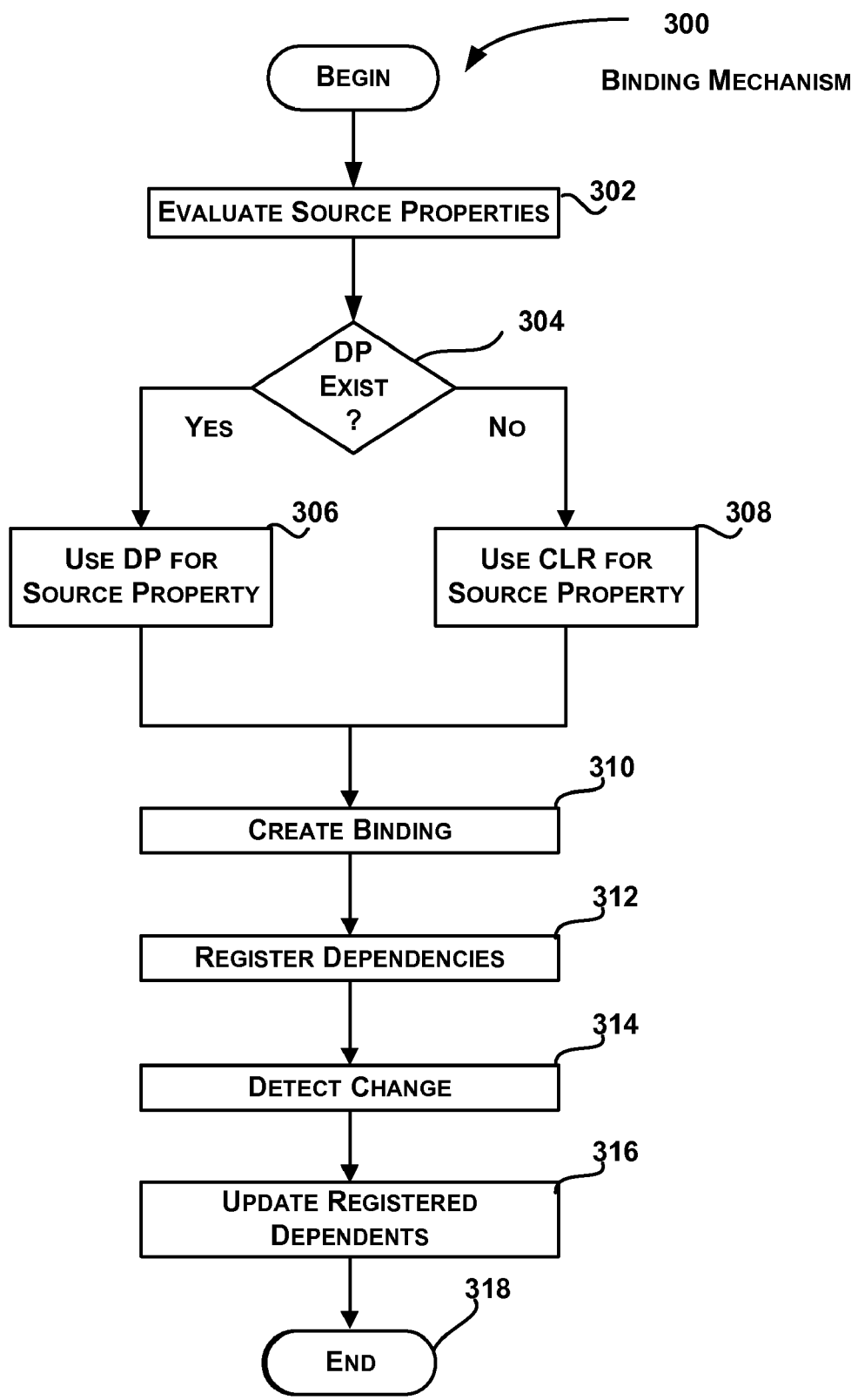
FIG. 3 is a logical flow diagram illustrating a process for binding a user interface property with a data value in accordance with one embodiment of the present invention.

FIG. 3 is a logical flow diagram illustrating a binding mechanism in accordance with one embodiment of the present invention. Initially, the binding mechanism selects a source property to be used for a binding. In block 302, source properties are evaluated determine whether the property is a public property (e.g., a public CLR property that can be reflected by using a PropertyInfo or a PropertyDesciptor) or a dependency property (DP).

The evaluation can be determined by finding a base object that is a DependencyObject at any component of the property path. Upon such occurrence, the data-binding engine then looks for a DP with the given name of the property. (The object can often have a CLR property with the same name, so preference is normally given to the DP if it exists.)

In block 304 processing continues at block 306 if a DP exists, and proceeds to block 308 if it does not. In block 306, the DP is used as a source property for the binding. In block 308, the reflected CLR is used as the source property.

For example, consider the declaration

<Button Content="*Bind(Path=Text)"/>.

Where the data item to which the declaration refers is a TextBox, TextBox defines a DP named "Text," and this DP is used as the source property.

In block 310, the binding is created. The binding can retrieve the value of a DP source property using the property engine's GetValue method. A two-way binding can update the source property using the SetValue method. In other words, DP bindings can use the property engine instead of reflection to get and set values.

DP bindings can use another feature of the property engine—DependencySources—to listen for changes to the source property (instead of using the IPropertyChange interface or any of the other mechanisms used by non-DP bindings). In the example above, the binding tells the property engine that it depends on the value of the textbox's Text property. In block 312, the binding registers the pair (textbox, Text) as one of its DependencySources. When the property engine detects a change to the textbox's Text (block 314), it notifies all the registered dependents. The binding receives this notification, and propagates the new value to the button (block 316). Once the source property is updated, processing proceeds to the end.

To use an attached DP as the source property, the author can enclose the full name of the attached property in parentheses, as in this example:

<HorizontalSlider Value="*Bind(Path=
(Canvas.Left))"/>.

This declaration causes the slider's "Value" property to be bound to a property attached to the source element, namely the "Left" property owned by the Canvas class. The parentheses help to resolve an ambiguity in the order of precedence; without the parentheses, this example might try to retrieve the value of a property named "Canvas" and then retrieve the value of the "Left" property from the result.

DPs can be intermixed with non-DPs in a single path:

<TextBox Text="*Bind(Path=Foo.(Canvas.Left).
Bar.Text)"/>

When this binding retrieves the source value, it effectively runs the following code:

| | |
|---|---|
| v = DataItem.Foo; | //CLR property |
| do = v as DependencyObject; | |
| v = do.GetValue(Canvas.LeftProperty); | //DP |
| v = v.Bar; | //CLR property |
| do = v as DependencyObject; | |
| v = do.GetValue(GetDependencyProperty(do, "Text")); | //DP |

Each component in the path names either a DP or a CLR property. As mentioned above, the binding will usually be programmed to try the DP interpretation first, then to use the CLR interpretation if the DP interpretation does not work. Attached properties (in parentheses) are normally treated as naming a DP.

The source item for a DP binding is often another UI element on the same page. Therefore, DP bindings usually use Bind.ElementID to specify the source. For example:

<TextBox ID="myTextBox" Text="hello, world"/>
<Button Content="*Bind(ElementID=myTextBox;
Path=Text)"/<

The code in this example binds the button's content to the textbox's text, using the ID to locate the element to be used as the source.

DP bindings are especially useful in styles for helping to implement control composition. To support this use, the Bind.RelativeSource property recognizes the special value "/StyledParent" to mean "the element being styled". For example, the ComboBox control has a Boolean DP named "IsDropDownOpen" that indicates whether the dropdown list is visible. The control is typically comprises several primitive controls, including a Popup control that has a DP named "IsOpen". The composition is described in a style, excerpted here:

```
<Style>
    <ComboBox>
        <Style.VisualTree>
            <Popup IsOpen="*Bind(Path=IsDropDownOpen;
            RelativeSource=/StyledParent)"/>
        </Style.VisualTree>
    </ComboBox>
</Style>
```

This example binds the IsOpen property of the Popup to the IsDropDownOpen property of the ComboBox. The result (after creating a ComboBox and applying the style) is that whenever the application sets ComboBox.IsDropDownOpen to true, the corresponding Popup's IsOpen property is set to true, which causes the Popup to display itself.

Fallback Values for Data Binding

Sometimes a binding is unable to obtain a value from the source object. This can happen for a number of reasons, some of which are errors (e.g. the author misspelled the name of the source property) and some of which are perfectly normal (e.g. the user moved the current item off the end of a data collection). However, it is useful for the binding to always provide a value to the target property. Conventional methods for binding have used the target property's default value, which a DP registers as part of its metadata.

In accordance with aspects of the present invention, a new property is provided (Bind.FallbackValue) that allows the author to specify a different value to use in cases where the binding cannot obtain a value from the source. For example, the markup <TextBox Text="*Bind(Path=CustomerName; FallbackValue=No Name)"/> indicates that the binding should use the string "No Name" instead of the Text property's default (empty string).

When setting this property from code, the author typically uses a value of the type expected by the target property. In markup, the value may be specified as a string (as in the above example) to which the standard type conversions are applied to obtain a value of the correct type.

For example, where the author knows (or suspects) that there may be some delay in obtaining desired data (e.g., waiting for a remote query or download), the author may wish to let the user know that the data is not yet available. The author could accomplish this by using one of the text fields in the UI as follows:

<Text TextContent="*Bind(Path=CustomerName; FallbackValue=Loading data, please wait . . . )"/>.

Before the real data is available, the text field will typically display the message "Loading data, please wait . . . ". When the data arrives, the binding is informed automatically and displays the newly arrived value of the CustomerName property instead.

As another example, a collection of Point objects for drawing a line can be provided with two properties called X and Y that have fallback values. To display a line connecting all the points, the author can write <ItemsControl ItemsSource="*Bind (DataSource={PointList})"
  Style="{ControlStyle}"
  ItemStyle="{PointStyle}"/>

This markup example uses three resources: PointList for declaring a data source for the list of points, ControlStyle for defining the style for the control and includes a panel such as Canvas that knows how to layout Line elements, and PointStyle for declaring how to display each point. An example of a PointStyle declaration is given as:

```
<Style def:Name="PointStyle">
    <Line StartX="*Bind(Path=X;
      RelativeSource=/Previous; FallbackValue=100)"
      StartY="*Bind(Path=Y;
      RelativeSource=/Previous; FallbackValue=100)"
    EndX="*Bind(Path=X)"
```

-continued

```
    EndY="*Bind(Path=Y)"/>
</Style>
```

When the markup is executed, a Line is produced that connects each point to the previous point in the list. The bindings for StartX and StartY will not ordinarily work for the first point (because there is no previous point to which the Line should be connected), but the fallback value indicates that the first line should start at the (arbitrarily specified) point (100, 100).

Priority Bindings for Data-Binding

Priority bindings are another way to implement bindings that may not be able to obtain a value from the source. In accordance with aspects of the present invention, a list of binding declarations is provided and the ordering of the list can be used to determine the order of bindings. For example, the first binding on the list (that can produce a working binding) can be selected as the binding that supplies the value to the target property. This rule can be dynamic such that if a binding listed early in the list later starts to work because of some change in its environment (e.g. its source data arrived), it can be selected as the "active" binding.

An example embodiment of priority bindings can be defined by the PriorityBind class. An instance of this class is a collection of Bind declarations and their associated Bindings. A user can add or remove Bind declarations to the collection either from code using the Add, Insert, and Remove methods, or in markup via the IAddChild interface. The example class ordinarily automatically creates the corresponding Bindings. The example class derives from Expression so that it can participate in the property engine as a source of property values, just as Binding itself does. A BindingCollection maintains which of the bindings is the active binding, and delegates the property engine's SetValue and GetValue calls to the active binding. The individual Bindings listen for events from their respective sources and inform the collection when they become able (or unable) to obtain a source value.

One possible use of priority bindings is related to a collection of heterogeneous data items. For example, where the collection contains objects of type either Pitcher or Hitter, both derived from the base type BaseballPlayer. Also, the author of an application would like to display the earned-run average for pitchers and the batting average for hitters. This author can accomplish this with a single control:

```
<Text>
    <Text.TextContent>
        <PriorityBind FallbackValue="n/a">
            <Bind Path="ERA"/>
            <Bind Path="Average"/>
        </PriorityBind>
    </Text.TextContent>
</Text>
```

When the data item is a Pitcher, the first binding will succeed and push the pitcher's ERA into the text control. When the data item is a Hitter, the first binding fails (because it cannot find a property named "ERA"), but the second data item binding succeeds and provides the hitter's batting average to the text control.

As shown in the above example, a BindingCollection can have its own fallback value, to be used when none of the individual bindings succeed. In our example, when the data item is neither a Pitcher or a Hitter (more precisely, when the data item does not have a property named "ERA" or "Average"), the text control is filled with the string "n/a".

Thus, as described, the present invention provides a mechanism for associating a source data value with a target property in such a manner that changes in the coding of the user interface and the logic may be de-coupled. Thus, the present invention allows developers to easily modify and enhance the user interface without requiring them to modify the underlying logic of the application.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-readable storage medium having computer executable instructions for controlling user-interface properties with data, the instructions when executed by a computer, perform a method comprising:
creating a binding between a data value and a user interface property that is associated with a user interface element; wherein the data value is displayed within the user interface element according to the user interface property; wherein the user interface property is configured to control a display of the user interface element, a display characteristic of the data value and to determine the data value to display within the user interface element; wherein the display characteristic relates to at least one of the following: a color to display the data value, a font to display the data value, a position within the user interface element to display the data value, and a size to display the data value; wherein the binding can specify a fallback value for the data value when the data value is unable to be obtained;
upon receiving a determination that the data value has undergone a change, evaluating dependencies of the data value, and reflecting changes in the user interface element based on the evaluated dependencies; and
selecting which binding is to be used for the data value by preferentially choosing dependency properties over non-dependency properties for the created binding.

2. The computer-readable storage medium of claim 1, further comprising registering dependencies of the data value in a dependency registry.

3. The computer-readable storage medium of claim 1, wherein the dependency property is an attached dependency property.

4. The computer-readable storage medium of claim 1, wherein the created binding is one-way.

5. The computer-readable storage medium of claim 1, wherein the created binding type is two-way.

6. The computer-readable storage medium of claim 1, further comprises using a method of the property engine to retrieve a value of the dependency property.

7. The computer-readable storage medium of claim 6, wherein the created binding is used in a style definition.

8. The computer-readable storage medium of claim 1, wherein the created binding is a one-time binding that transfers a value from a source to a target and does not subsequently change the transferred value in response to a change in the source.

9. A method, performed by a computer system, for controlling user-interface properties with data, the method comprising:
creating a binding that associates a user interface property with a source data value that comprises a dependency property; wherein the source data value is displayed within the user interface element according to the user interface property; wherein the user interface property is configured to control a display of the user interface element, a display characteristic of the source data value and to determine the source data value to display within the user interface element; wherein the display characteristic relates to at least one of the following: a color to display the source data value, a font to display the source data value, a position within the user interface element to display the source data value, and a size to display the source data value; wherein the binding can specify a fallback value for the source data value when the source data value is unable to be obtained;
upon receiving a determination that the associated source data value has undergone a change, evaluating dependencies of the associated source data value, and reflecting changes in the user interface property based on the evaluated dependencies; and
selecting which binding is to be used for the source data value by preferentially choosing dependency properties over non-dependency properties for the created binding.

10. The method of claim 9, further comprising registering dependencies of the associated source data value in a dependency registry.

11. The method of claim 9, wherein the dependency property is an attached dependency property.

12. The method of claim 9, wherein the created binding is one-way.

13. The method of claim 9, wherein the created binding type is two-way.

14. The method of claim 9, further comprises using a method of the property engine to retrieve a value of the dependency property.

15. The method of claim 14, wherein the created binding is used in a style definition.

16. The method of claim 9, wherein the created binding is a one-time binding that transfers a value from a source to a target and does not subsequently change the transferred value in response to a change in the source.

17. A system for controlling user-interface properties with data, comprising:
a processor and a computer-readable storage medium;
an operating environment stored on the computer-readable storage medium and executing on the processor;
an application operating under the control of the operating environment and configured for:
creating a binding that associates a target property with a source data value that comprises a dependency property; wherein the target property is a user interface property for a user interface element; wherein the source data value is displayed according to the target property; wherein the target property is configured to control a display of the user interface element, a display characteristic of the source data value and to determine the source data value to display within the user interface element; wherein the binding specifies a fallback value for the data value when the data value is unable to be obtained; and
upon receiving a determination that the associated source data value has undergone a change, evaluating dependencies of the associated source data value;
reflecting changes in the target properties based on the evaluated dependencies; and selecting which binding is to be used for the source data value by preferentially choosing dependency properties over non-dependency properties for the created binding.

18. The system of claim 17, further comprising registering dependencies of the associated source data value in a dependency registry.

19. The system of claim 17, wherein the dependency property is an attached dependency property.

20. The system of claim 19, wherein the created binding is one-way.

21. The system of claim 19, wherein the created binding type is two-way.

22. The system of claim 19, wherein the created binding is a one-time binding that transfers a value from a source to a target and does not subsequently change the transferred value in response to a change in the source.

23. The system of claim 17, further comprises using a method of the property engine to retrieve a value of the dependency property.

24. The system of claim 23, wherein the created binding is used in a style definition.

* * * * *